United States Patent
Kline et al.

(10) Patent No.: US 10,319,001 B2
(45) Date of Patent: *Jun. 11, 2019

(54) SYSTEM, METHOD, AND APPARATUS FOR PURCHASING, DISPENSING, OR SAMPLING OF PRODUCTS

(71) Applicants: Michael J. Kline, Newport Beach, CA (US); Denise Lisa Salvucci, Newport Beach, CA (US)

(72) Inventors: Michael J. Kline, Newport Beach, CA (US); Denise Lisa Salvucci, Newport Beach, CA (US)

(73) Assignee: TRANSPARENSEE LLC, Marietta, GA (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/480,464

(22) Filed: Apr. 6, 2017

(65) Prior Publication Data

US 2017/0213260 A1    Jul. 27, 2017

Related U.S. Application Data

(63) Continuation of application No. 14/087,881, filed on Nov. 22, 2013, now Pat. No. 9,633,504.

(51) Int. Cl.
| | |
|---|---|
| *G06Q 30/02* | (2012.01) |
| *G07F 11/62* | (2006.01) |
| *G06F 17/30* | (2006.01) |
| *G06F 16/951* | (2019.01) |
| *G07F 13/06* | (2006.01) |

(52) U.S. Cl.
CPC ....... *G06Q 30/0282* (2013.01); *G06F 16/951* (2019.01); *G06Q 30/0259* (2013.01); *G06Q 30/0261* (2013.01); *G06Q 30/0267* (2013.01); *G07F 11/62* (2013.01); *G07F 13/065* (2013.01)

(58) Field of Classification Search
CPC .......... G06Q 30/0282; G06Q 30/0259; G06Q 30/0261; G06Q 30/0267; G06F 16/951; G07F 11/62; G07F 13/065
USPC .................................................. 700/231–244
See application file for complete search history.

(56) References Cited

U.S. PATENT DOCUMENTS

| | | |
|---|---|---|
| 4,512,431 A | 4/1985 | Bloomfield |
| 4,534,818 A | 8/1985 | Kreager et al. |
| 6,161,059 A | 12/2000 | Tedesco et al. |

(Continued)

FOREIGN PATENT DOCUMENTS

| | | |
|---|---|---|
| CA | 2912016 A1 | 11/2014 |
| WO | 98/45766 A1 | 10/1998 |
| WO | 2013/077895 A1 | 5/2013 |

OTHER PUBLICATIONS

U.S. Appl. No. 14/609,247: Non Final Rejection dated Mar. 10, 2017, 14 pages.

(Continued)

*Primary Examiner* — Michael Collins
(74) *Attorney, Agent, or Firm* — BakerHostetler

(57) ABSTRACT

Systems, methods, and apparatus for the purchase of and/or free sampling of products. The systems, methods, and/or apparatus may permit push notifications of purchased products and/or free product samples being available and may permit the use of mobile devices and/or mobile device applications to be used to purchase products or dispense free samples of products via a product dispenser or vending machine.

20 Claims, 2 Drawing Sheets

(56) References Cited

U.S. PATENT DOCUMENTS

| | | | |
|---|---|---|---|
| 6,413,000 | B1 | 7/2002 | Borcherds et al. |
| 6,751,525 | B1 | 6/2004 | Crisp, III |
| 7,493,267 | B1 | 2/2009 | Walker et al. |
| 7,627,496 | B2* | 12/2009 | Walker .................. G06Q 20/02 705/16 |
| 7,757,896 | B2 | 7/2010 | Carptenter et al. |
| 8,340,815 | B2 | 12/2012 | Peters et al. |
| 8,364,520 | B1 | 3/2013 | Eichorn et al. |
| 8,392,019 | B2 | 3/2013 | Segal et al. |
| 8,489,450 | B2 | 7/2013 | Agarwal |
| 8,601,938 | B2 | 12/2013 | Huber et al. |
| 8,616,250 | B2 | 12/2013 | Herbert |
| 8,656,690 | B2 | 2/2014 | Bierschenk et al. |
| 8,744,618 | B2 | 6/2014 | Peters et al. |
| 8,755,932 | B2 | 6/2014 | Peters et al. |
| 8,787,006 | B2 | 7/2014 | Golko et al. |
| 8,788,341 | B1 | 7/2014 | Patel et al. |
| 9,155,330 | B1 | 10/2015 | Shtivelman |
| 9,527,716 | B2* | 12/2016 | Kline .................. B67D 1/0888 |
| 9,633,504 | B2* | 4/2017 | Kline .................. G06Q 30/0259 |
| 9,701,530 | B2* | 7/2017 | Kline .................. B67D 1/0888 |
| 2002/0173875 | A1 | 11/2002 | Wallace et al. |
| 2003/0055727 | A1 | 3/2003 | Walker et al. |
| 2003/0208409 | A1 | 11/2003 | Mault |
| 2004/0049427 | A1 | 3/2004 | Tami et al. |
| 2004/0065700 | A1 | 4/2004 | Milian |
| 2004/0118733 | A1 | 6/2004 | Pauli |
| 2004/0137078 | A1 | 7/2004 | Najafi et al. |
| 2004/0241759 | A1 | 12/2004 | Tozer et al. |
| 2004/0249711 | A1 | 12/2004 | Walker et al. |
| 2005/0048461 | A1 | 3/2005 | Lahteenmaki |
| 2005/0193896 | A1 | 9/2005 | McGill |
| 2005/0210834 | A1 | 9/2005 | Kamineni |
| 2005/0226970 | A1 | 10/2005 | Gordon |
| 2005/0273387 | A1 | 12/2005 | Previdi |
| 2006/0027597 | A1 | 2/2006 | Chow et al. |
| 2006/0081653 | A1 | 4/2006 | Boland et al. |
| 2006/0247824 | A1 | 11/2006 | Walker et al. |
| 2006/0278093 | A1 | 12/2006 | Biderman et al. |
| 2007/0027576 | A1 | 2/2007 | Juds et al. |
| 2007/0050083 | A1 | 3/2007 | Signorelli et al. |
| 2007/0078561 | A1 | 4/2007 | Sansone |
| 2007/0100649 | A1 | 5/2007 | Walker et al. |
| 2007/0110880 | A1 | 5/2007 | Thomas et al. |
| 2007/0156523 | A1 | 7/2007 | Liu et al. |
| 2007/0255450 | A1 | 11/2007 | Mazur et al. |
| 2008/0077455 | A1 | 3/2008 | Gilboa |
| 2009/0065520 | A1 | 3/2009 | Peters et al. |
| 2009/0065570 | A1 | 3/2009 | Peters et al. |
| 2009/0069931 | A1 | 3/2009 | Peters et al. |
| 2009/0070234 | A1 | 3/2009 | Peters et al. |
| 2009/0138817 | A1 | 5/2009 | Oron et al. |
| 2009/0177318 | A1 | 7/2009 | Sizemore |
| 2009/0222300 | A1 | 9/2009 | Guith et al. |
| 2009/0222301 | A1 | 9/2009 | Phillips et al. |
| 2009/0222339 | A1 | 9/2009 | Antao et al. |
| 2009/0222340 | A1 | 9/2009 | Insolia et al. |
| 2010/0131096 | A1* | 5/2010 | Koyano .................. G06Q 30/02 700/236 |
| 2010/0169313 | A1 | 7/2010 | Kenedy et al. |
| 2010/0200110 | A1 | 8/2010 | Segiet et al. |
| 2010/0280895 | A1 | 11/2010 | Mottola |
| 2010/0286819 | A1 | 11/2010 | Walker et al. |
| 2011/0038474 | A1 | 2/2011 | Omiya |
| 2011/0049180 | A1 | 3/2011 | Carpenter et al. |
| 2011/0121032 | A1 | 5/2011 | Deo et al. |
| 2011/0168290 | A1 | 7/2011 | Breitenbach et al. |
| 2011/0282723 | A1 | 11/2011 | Phillips et al. |
| 2012/0053426 | A1 | 3/2012 | Webster et al. |
| 2012/0055718 | A1 | 3/2012 | Chen |
| 2012/0150613 | A1 | 6/2012 | Insolia et al. |
| 2012/0190386 | A1 | 7/2012 | Anderson |
| 2012/0325844 | A1 | 12/2012 | Quartarone et al. |
| 2012/0325845 | A1 | 12/2012 | Newman et al. |
| 2013/0002724 | A1 | 1/2013 | Heinrich et al. |
| 2013/0025529 | A1 | 1/2013 | Key |
| 2013/0027060 | A1 | 1/2013 | Tralshawala et al. |
| 2013/0035787 | A1 | 2/2013 | Canter |
| 2013/0037565 | A1 | 2/2013 | Newman |
| 2013/0044042 | A1 | 2/2013 | Olsson et al. |
| 2013/0079117 | A1 | 3/2013 | Maskatia et al. |
| 2013/0079926 | A1 | 3/2013 | Peters et al. |
| 2013/0096715 | A1 | 4/2013 | Chung et al. |
| 2013/0103187 | A1 | 4/2013 | Canter et al. |
| 2013/0220480 | A1 | 8/2013 | Angus et al. |
| 2013/0226338 | A1 | 8/2013 | Pickett et al. |
| 2013/0240559 | A1 | 9/2013 | Rudick |
| 2013/0245819 | A1 | 9/2013 | Davenport et al. |
| 2013/0248560 | A1 | 9/2013 | Carpenter et al. |
| 2013/0282169 | A1 | 10/2013 | Moore et al. |
| 2013/0282451 | A1 | 10/2013 | Moore et al. |
| 2013/0304265 | A1 | 11/2013 | Deo et al. |
| 2014/0027502 | A1 | 1/2014 | Schwartz |
| 2014/0040055 | A1 | 2/2014 | Quartarone et al. |
| 2014/0130891 | A1 | 5/2014 | Abdelmoteleb et al. |
| 2014/0135967 | A1 | 5/2014 | Bippert |
| 2014/0212566 | A1 | 7/2014 | Herbert et al. |
| 2014/0246452 | A1 | 9/2014 | Roekens et al. |
| 2014/0255883 | A1 | 9/2014 | MacQuet |
| 2014/0257749 | A1 | 9/2014 | Nathanson |
| 2014/0286123 | A1 | 9/2014 | Arnett et al. |
| 2014/0307756 | A1 | 10/2014 | Chen et al. |
| 2014/0356492 | A1 | 12/2014 | Merea |
| 2015/0100152 | A1* | 4/2015 | Barragan Trevino ..................... G06Q 20/322 700/232 |
| 2015/0105901 | A1* | 4/2015 | Joshi .................. G06Q 20/18 700/232 |
| 2015/0144650 | A1 | 5/2015 | Kline et al. |
| 2015/0144652 | A1 | 5/2015 | Kline et al. |
| 2015/0144653 | A1 | 5/2015 | Kline et al. |
| 2015/0239724 | A1 | 8/2015 | Cronise |
| 2015/0290795 | A1 | 10/2015 | Oleynik |
| 2016/0005329 | A1 | 1/2016 | Sako et al. |
| 2016/0012749 | A1 | 1/2016 | Connor |

OTHER PUBLICATIONS

U.S. Appl. No. 14/609,247: Final Rejection dated Jun. 30, 2017, 19 pages.

U.S. Appl. No. 14/609,241: Non Final Rejection dated Apr. 21, 2017, 12 pages.

"Food Labeling: Calorie Labeling of Articles of Food in Vending Machines", Federal Register, Dec. 1, 2014, pp. 1-35.

International Patent Application No. PCT/US2015/040939: International Search Report and Written Opinion dated Dec. 31, 2015, 13 pages.

Dietz, "Wireless Liquid Level Sensing for Restaurant Applications", MERL—A Mitsubishi Electric Research Laboratory, Apr. 2002, pp. 1-8.

Caprio, "Calories from Soft Drinks—Do They Matter?", The New England Journal of Medicine, Sep. 27, 2012, pp. 1-2.

"Food Labeling: Nutrition Labeling of Standard Menu Items in Restaurants and Similar Retail Food Establishments", Federal Register, Dec. 1, 2014, pp. 1-105, vol. 79, No. 230.

\* cited by examiner

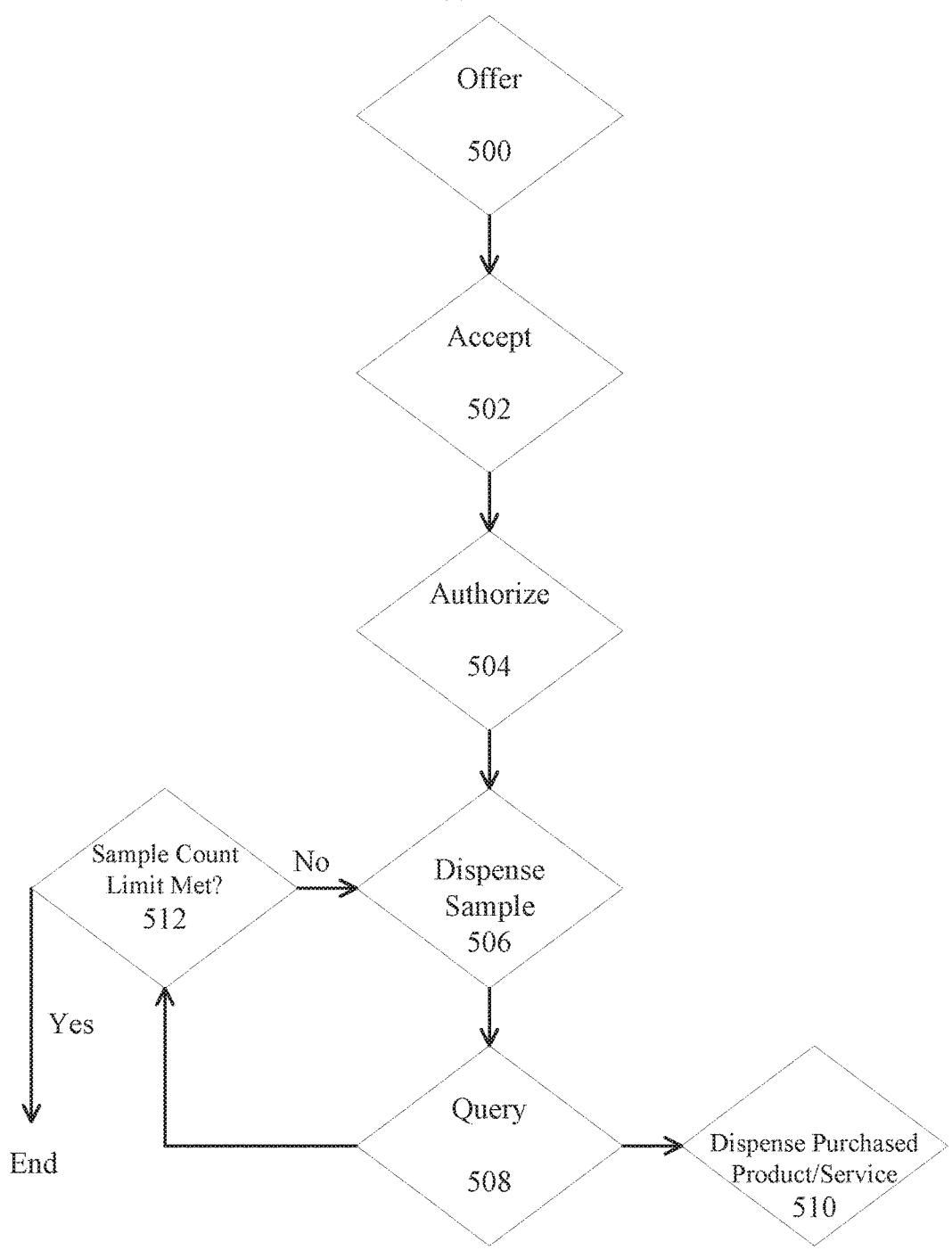

SYSTEM, METHOD, AND APPARATUS FOR PURCHASING, DISPENSING, OR SAMPLING OF PRODUCTS

CROSS REFERENCE TO RELATED APPLICATIONS

This application is a continuation of U.S. patent application Ser. No. 14/087,881, filed on Nov. 22, 2013, which is incorporated herein by reference in its entirety.

BACKGROUND

Consumers are becoming increasingly savvy in their product purchasing behaviors. They use their smart phones to perform price comparisons. They select, at point of purchase, from several available options. For example, users may select from one of several different car washes available at a gasoline kiosk. And, when shopping for food or other products, consumers frequently ask the seller to try a free sample of the food or other product, such as perfume, being sold or displayed. There exists an opportunity and need to provide consumers with a greater range of options when making their purchasing decisions.

The Coca-Cola Company currently markets and sells non-alcoholic beverages through various outlets and dispensing and vending equipment. One such type of dispensing equipment is known as the Freestyle® dispensing machine, which permits customers to select from over one hundred different product and flavor combinations. Such dispensing machines are often placed in fast food restaurants, convenience stores, malls, and other venues that tend to attract consumers. An example of the apparatus, processes, methods, and systems potentially associated with the Freestyle® dispensing machine is disclosed in U.S. Pat. No. 8,340,815, to Peters, et al., incorporated in its entirety by reference herein.

Frequently, a consumer attempting to use a Freestyle® vending machine may be uncertain as to which of the over one hundred offerings to choose. This can lead to not only an unhappy consumer who may select an offering that he or she does not enjoy, but also may lead to other unhappy consumers waiting in line for such uncertain consumers to make a flavor selection.

The Coca-Cola Company currently provides a Freestyle® smart phone application that may be directed at addressing this problem by permitting consumers to pre-select on the application their favorite flavor offerings. The application permits consumers to consult a selection of over one hundred choices, mix their own virtual flavors, and start adding favorite brands and mixes to the application user's favorites list. The application provides for push notifications, locates Freestyle® machines in proximity to the application user, and offers a "Mobile App Sweepstakes."

The Coca-Cola Company, and other entities that sell products, are continuously looking for new ways to market their products and demonstrate their attributes relative to competitive products and to encourage consumers to try both existing and new product offerings. Moreover, given the well-publicized global obesity epidemic, companies that sell calorie containing products are working hard to offer lower calorie options and to demonstrate to the consuming public, as well as governmental agencies, of their efforts in this regard.

SUMMARY

According to one aspect of the disclosure, there may be provided a method comprising initiating a push notification offering a free product sampling, receiving a response to the push notification indicative of an acceptance of the offering, and authorizing the dispensing of the free product sampling. The push notification may be provided via a mobile device application.

According to another aspect of the disclosure, there may be provided a product dispenser configured to dispense one or more products, the product dispenser may be further configured to dispense a sample size of the one or more products. The product dispenser may further comprise a user interface configured to permit a customer to request a free sample from the product dispenser, and a product size discriminator configured to discriminate between and dispense the one or more products according to whether a purchased product size or a sample product size has been selected for dispensing.

According to another aspect of the disclosure, there may be provided a system comprising a product dispenser configured to dispense a purchased product and a free sample of a product corresponding to the purchased product; and a mobile application configured to receive push notifications offering to dispense free samples of product from the dispenser.

BRIEF DESCRIPTION OF THE DRAWINGS

FIG. 2 illustrates operations that may be used for carrying out one or more methods of the present disclosure.

DETAILED DESCRIPTION

Figure 1:
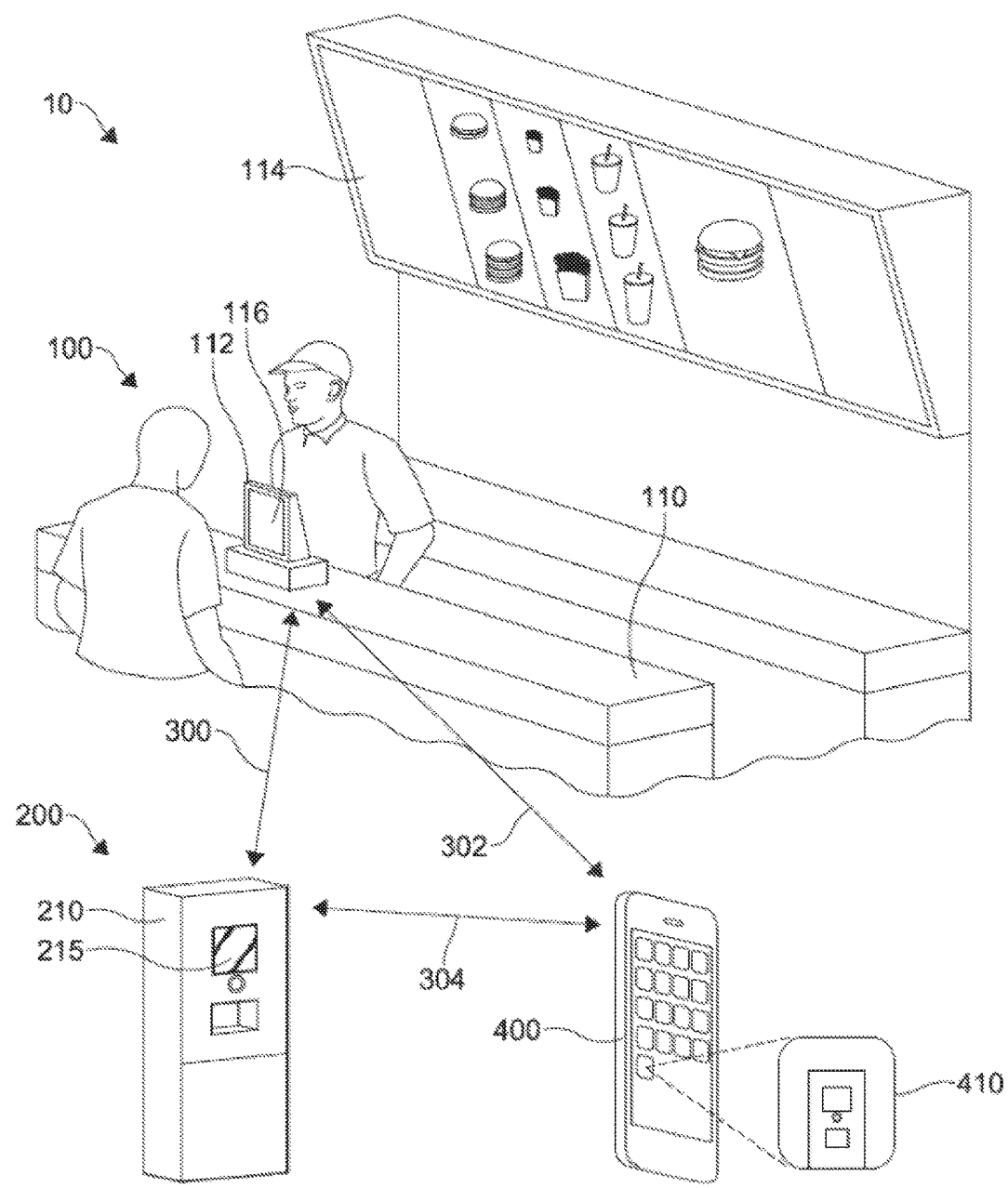
FIG. 1 illustrates a schematic representation of systems, methods, and/or apparatus of the present disclosure.

In one aspect of the disclosure illustrated in FIG. 1, a system, generally 10, comprising a point of sale, generally 100, and a dispensing area, generally 200, may be provided. The point of point of sale 100 may, for example, include one or more of a counter 110, a cash register 112, and a menu 114. Additionally or optionally, the point of sale 100 may include a display 116, such as are commonly used in connection with drive-through areas of fast food restaurants, gas stations, banks, and pharmacies, for example.

The dispensing area 200 may comprise one or more apparatus for dispensing products. For example the dispensing area 200 may comprise a dispensing machine 210 such as a Freestyle® type beverage dispenser that provides Freestyle® type beverage products of The Coca-Cola Company. Such dispensing machine 210 may comprise a keypad, touchscreen, or graphical user interface 215 configured to permit a consumer to make purchasing decisions and/or product selections from the dispensing area 200. Additionally or alternatively, the dispensing area 200 may comprise a vending machine, such as those used for vending packaged or unpackaged products, such as beverages in bottles or cans, toiletries, laundry products, pharmaceutical products, electronic products, golf balls at driving ranges, coffee beans, and the like. As another example, the dispensing machine 210 may provide products such as Apple® smart phones, tablets, and related accessories sold by Apple Computer Company, or software products such as those sold by Microsoft Corporation.

In one aspect of the disclosure, the point of point of sale 100 may be in communication with the dispensing area 200, either through a wired or wireless connection, generally 300. Indeed, the point of point of sale 100 may be in close proximity or even comprise the dispensing area 200, as in the case of a vending machine. The connection 300 may permit the point of point of sale 100 to communicate information to the dispensing area 200. Such information may, for example, include information that a purchase has been made, that the purchase, if made with a credit card, has been validated, and/or that a particular product has been selected.

One or more of the point of point of sale 100 and dispensing area 200 may communicate with a handheld or mobile device, such as a consumer's smart phone, generally 400, e.g., via a wired or wireless connection 302 between the point of sale 100 and the smart phone 400 (or other mobile device) and/or between the smart phone 400 and the dispensing area 200, via a wired or wireless connection 304. The smart phone 400 may include one or more applications 410 that may be provided by or on behalf of a merchant, such as the owner of a restaurant, store, gas station, or other location in which a dispensing area is placed, or may be provided by the entity that markets or sells the products being dispensed, such as The Coca-Cola Company in the case of a dispensing area 200 comprising a Freestyle® dispensing machine 210, and the Freestyle smart phone application, for example.

In one aspect of the disclosure, a consumer may register with a provider of products or services, such as The Coca-Cola Company, using the application 410. Such registration may be used to set up an account with the provider, verify credit accounts, set limits on purchase amounts, etc. Such registration may further provide the consumer with permissions to access the dispensing area, either by using credit accounts, by using bank accounts, or by using a code or other identifier that may be provided, for example, by the provider of products or services, by the smart phone application provider, by the smart phone service provider, or at the point of purchase, for example, by the operator of the restaurant in which the point of point of sale 100 resides.

In another aspect of the disclosure, the dispensing area 200 may comprise apparatus, systems, and/or components 220 configured to permit a consumer to try a free sample of product. In the case of a Freestyle® dispensing machine 210, a free sample module 230 may be included within the dispensing machine 210. The free sample module 230 may include an area, such as a virtual button 240 on the graphical user interface 215 of the dispensing machine 210. The free sample module 230 may also include a dispenser for dispensing a free sample cup 260. The free sample cup 260 may be of a size that may hold a free sample that is significantly less than a standard serving size, i.e., less than 8 fluid ounces. In one aspect, the free sample cup 260 may hold one or two fluid ounces or less. Unless used otherwise herein, the term "sample size", in the context of liquid beverage samples, is intended to mean a single serving of less than about 8 fluid ounces (about 240 ml). In the case of other liquid products, such as laundry detergent, the term "sample size" is intended to mean sufficient liquid to perform a single operation, such as washing a typical load of clothing. As another example, in the case of contact lens solution, the term "sample size" is intended to mean several drops for one or two doses to enable application of the solution to one or two contact lenses. As another example, in the case of a cosmetic, perfume, or cologne sample, the term "sample size" is intended to mean a volume of cosmetic, perfume, or cologne roughly corresponding to the volume contained in a commercially available sample vial, packet, or other container, i.e., generally sufficient quantity for a single use.

In one aspect, it has been found that a sample size of about 2 fluid ounces (about 30 ml) of a beverage may provide sufficient sampling for a consumer to determine whether he or she wishes to dispense a full-sized single serve drink. Consumers are accustomed to being accorded free samples, for example, in supermarkets at the deli case, where such samples are provided in small disposable cups, sometimes with disposable forks or spoons. As with the supermarket example, a vendor or provider of other products, including liquid products such as beverages (both alcoholic and non-alcoholic), liquid soap, liquid detergent, lotion (hand lotion, body lotion, etc.), perfume, mouthwash, contact lens solution etc., may find it advantageous when promoting its products to provide consumers with free samples such as described herein.

The system of the present disclosure may permit a consumer to access a free sample in a number of ways. For example, the consumer may purchase a beverage of unspecified type at the point of point of sale 100. After making the purchase, the consumer may receive a code, for example on the sales receipt, that the consumer may input at the dispensing machine 210 in order to access one or more free samples. Alternatively, the consumer may have previously registered with the provider of products or services and created a password, for example, on a smart phone application, such as application 410, giving the consumer access to make purchases via his or her smart phone application. The same code or other type of access authorization may also grant the consumer authorization to select a full-size single serve beverage, or may grant the consumer authorization to access a predetermined number of servings of predetermined size. The code, or other authorization, may be input in different ways. For example, the dispensing machine 210 may comprise a virtual keypad that is part of the graphical user interface, or an actual keypad that is part of the dispensing machine 210. Alternatively, as described above, the authorization may be achieved merely by the user inputting his or her password into a smart phone application, such as application 410, which grants wireless access to the dispensing machine 210.

As another example, the consumer may have on his or her smart phone an application 410 provided by the seller of products such as, for example, The Coca-Cola Company. This application may include a user identification system that may recognize the user, based on a unique identifier provided by the seller, by the application provider, by the smart phone 400, or by a wireless service provider with whom the consumer has an account. Such identification system may, for example, permit the uses to enter his or her unique password as part of the application log on process. After log on is completed, the application 410 may, for example through wireless communication, instruct the dispensing machine 210 that the user has permission to dispense a free sample. Once permission has been granted, the consumer may be notified, i.e., via the graphical user interface on the dispensing machine 210, and/or on the smart phone 400 display, that permission has been granted to pour a free sample from the dispensing machine 210. The same identification system may also be employed to purchase products and/or dispense purchased products from the dispensing machine 210.

The systems, apparatus, and methods of the present disclosure may also be employed with more traditional beverage dispensing equipment, sometimes known as "legacy" fountain dispensing equipment, such as that used by outlets serving beverages marketed by PepsiCo. When used with legacy equipment, such equipment may be retrofitted with wireless communication components and portion control apparatus to enable dispensing of product as described herein.

In another aspect of the disclosure, the smart phone application may include, for example, push notifications that alert the consumer to new offerings, such as new flavors being offered by the product provider. Such notifications may additionally, or alternatively, make free product samples available for a limited time, at limited locations, for predetermined brands or flavors, and/or in predetermined quantities, for example.

Referring now to FIG. 2, there is illustrated a method of practicing an embodiment of the present disclosure. At operation 500, a notification, such as a push notification, may be initiated, for example, by a product seller, by a service provider, by an application provider, by a mobile device such as a smart phone, or by a wireless service provider with whom a consumer has an account. This notification may be intended for one or more intended recipients, such as consumers, for example, advising them of a product or service offering and providing them an opportunity to accept a free sample of a product or a service.

At operation 502, the initiator of the notification may receive a response indicative of an acceptance of the offer, for example, from the one or more intended recipients. Such response may require the intended recipient(s) to register with the initiator of the notification, for example, by joining or downloading the smart phone application 410 onto their smart phone 400. Such registration may also require the intended recipient(s) to provide customer information such as location, demographic information, product preferences, and/or provide payment information such as a credit card number.

At operation 504, the initiator of the offer may authorize the dispensing of a free product sample or a free sample of a service. Such authorization operation may include receiving information from one or more intended recipients indicative of the one or more intended recipients having joined or downloaded a mobile application, such as mobile application 410. Such authorization may include verifying that the intended recipient accepting the offer has registered with the initiator of the offer, that the intended recipient has created an account capable of paying for a product or service corresponding to the sample product or service, or merely verifying that the intended recipient is in close proximity to the dispensing area 200.

In an alternative method, the free product or service may be authorized for dispensing at a point of sale 100. For example, if a customer purchases products such as food items at a point of sale 100, he or she may be given an offer to try a free sample of products, such as beverages, at the dispensing area 200. Such offer may include a personal identifier for the customer, such as a password or code that the customer may input, either wirelessly via a handheld device, or using a touch screen or touch pad associated with the dispensing machine 210. Alternatively, an operator at the point of sale 100 may instruct the dispensing machine 210, for example, via the wired or wireless connection 300, to permit the customer to dispense the free sample.

As another alternative, a customer may employ a mobile device, such as a smart phone 400 to place an order for a free product and/or a purchased product via the wired or wireless connection 302 to the point of sale 100. In this embodiment, the customer may or may not be responding to a push notification, rather, may initiate the communication that enables the dispensing of a free sample. In still another alternative, the customer may bypass the point of sale 100 entirely, for example, by using a mobile device, such as a smart phone 400, to connect via the wired or wireless connection 304 directly with the dispensing machine 210.

As illustrated, the wired or wireless connections 300, 302, 304 may be one-way or two-way connections.

At operation 506, information indicative that the free product sampling has been dispensed may be received, for example, by the initiator of the offer. Receipt of such information may be followed up with additional push notifications. For example, after the recipient has sampled the free product sample, as evidenced by the information obtained at operation 506, at operation 508 a query or second push may be initiated, for example by sending to the one or more intended recipients a query asking if they would like to purchase the product corresponding to the sampled product. Additionally or alternatively at operation 508, the second query may ask for feedback, such as asking such recipients to rate their experience in sampling the free product, for example, indicating on a scale of 1 to 10 how much they liked the product. Depending on the feedback received, for example, if the sample was highly rated, the intended recipient may be asked if he or she would like to purchase the product corresponding to the free sample. On the other hand, if the sample was not highly rated, the intended recipient may be offered one or more additional free product samplings.

Depending on the second push or query sent at operation 508, and the response received at operation 510, the dispensing of one or more free samples and/or the dispensing of purchased product corresponding to the sampled product may be authorized. For example, if at operation 508 a response to the second push notification reveals negative feedback relative to the initial product sampling and/or that the intended recipient would like to sample one or more additional free samples, then operation 510 may authorize the dispensing of one or more additional free samples. In order to avoid an "endless loop" of negative feedback by intended recipients merely trying to "game the system" by obtaining unlimited free product samples, a counter operation may be interposed, i.e., at operation 512, to cut off the opportunity for additional free samples after a predetermined number, for example three free samples. Thus, operation 512 may count the number of requests for free samples made in response to the query operation 508 and if a predetermined number of free sample requests has not be met, may authorize the dispensing of additional free samples. Alternatively, if a predetermined number of free sample requests has been met, then operation 512 may indicate that this is the case and end the free sample query. Alternatively, the counter operation 512 may be interposed prior to the query operation 508 to indicate prior to the query being made that the predetermined number of free samples has been dispensed, and end the free sample offering.

As indicated, the query or second push operation 512 may ask the intended recipient to indicate if he or she is interested in purchasing the product or service corresponding to the free sample. If an affirmative indication is received, then the dispensing of the purchased product or service may be authorized at operation 510.

The product dispensing machine, when used for dispensing liquid product, may be of the general configuration of The Coca-Cola Company Freestyle® dispensing machine, improved according to the teachings described herein. As is well known, the Freestyle® dispensing machine stores beverage concentrates, such as Coke®, Sprite®, and other beverage concentrates and flavor concentrates, such as lemon, cherry, etc., in multiple cartridges housed within the body of the machine. These various concentrates, as is also well known, are mixed and dispensed by the Freestyle® dispensing machine in microliter doses with carbonated water to produce a finished beverage. In order to retain the desired flavor and quality profile of the concentrates, the cartridges may be chilled and/or periodically agitated by the machine. The Freestyle® vending machine is currently configured to pour a selected purchased beverage into a customer's glass, cup, or other receptacle without discriminating as to the size of the pour. Thus, a customer could currently pour a one-ounce, eight ounce, or thirty-two ounce serving of purchased product, but cannot currently request a sample size of a free product sample or a purchased beverage of a predetermined size.

The Freestyle® dispensing machine may be modified, however, to limit the size or quantity of the pour in response to the size of beverage being purchased and/or the size or quantity of a free sample to be dispensed. Such discrimination may be achieved using known portion control apparatus and/or software configured to limit portion sizes. In this way, a consumer might determine, due to calorie count of a caloric beverage, that he or she only wishes to purchase a smaller than standard serving size, such as a six ounce serving, for example.

The Freestyle® dispensing machine may be further configured to offer and/or display the price of a beverage based on serving size. For example, a consumer might be permitted to order any size beverage in one-ounce increments, based on a price schedule that might offer a variable price per fluid ounce based on the volume selected. Given the current obesity epidemic worldwide, but particularly in the United States, where the Freestyle® vending machine is most prominent, consumers may appreciate the option of buying only as much product as they want at a Freestyle® dispenser, particularly in the case of children, who often cannot finish a standard 8-ounce serving, and for whom obesity concerns may be particularly acute.

A sample price schedule, which may be displayed by the Freestyle® vending machine on the user interface or touchscreen 215 might appear as set forth in the following example, termed for illustrative purposes as "Freestyle® Variserve™ Pricing:

| Freestyle ® Variserve ™ Pricing | | | |
|---|---|---|---|
| Serving Size (Oz.) | Price Per Oz. ($) | Price Per Serving ($) | Calories Per Serving |
| 1 | 0.20 | 0.20 | 12.5 |
| 2 | 0.20 | 0.40 | 25 |
| 3 | 0.20 | 0.60 | 37.5 |
| 4 | 0.1625 | 0.65 | 50 |
| 5 | 0.014 | 0.70 | 62.5 |
| 6 | 0.133 | 0.80 | 75 |
| 7 | 0.129 | 0.90 | 87.5 |
| 8 | 0.125 | 1.00 | 100 |

The user interface may be configured to permit the consumer to select the serving size desired simply by pressing a touch screen section on the graphical user interface 215 corresponding to the desired serving size, i.e., as displayed on the Freestyle® Variserve™ Pricing menu illustrated above.

In another aspect of the disclosure, the seller of calorie containing products may, in order to encourage consumption of lower calorie offerings, and/or demonstrate to governmental organizations and/or the public generally their commitment to combatting the obesity epidemic, use the systems, methods, and/or apparatus disclosed herein to price their products with variable pricing based on the caloric content of the products being dispensed, for example, pricing products at a fixed price per calorie, or according to a pricing schedule that prices product being dispensed at a lower price per unit weight or volume for lower calorie products relative to products that contain a greater number of products per serving. Indeed, the variable price concept of the present disclosure may be used in combination with the portion control concept, creating a "double bonus" by offering even lower prices when both lower calorie and lower serving size selections are made. Other combinations are, of course possible.

Moms and people trying to control their weight by counting calories would benefit from being able to dispense food and beverage products based on the number of calories, such as one hundred calories' worth of beverage, nuts, seeds, yogurt, etc. Accordingly, another aspect of the disclosure may employ the teachings herein to dispense a predetermined number of calories of food or beverage product, for example, at the consumer's choosing. The dispensing apparatus may also be configured to price the product thus dispensed according to the total number of calories dispensed, rather than the weight or volume of product being dispensed.

A dispensing machine 210, such as a Freestyle® dispensing machine, may be modified to allow pricing and sales based on caloric content of the beverages offered. A price per calorie or additional surcharge per calorie may be established. In one embodiment, a discount or rebate is applied for low-calorie or zero-calorie selections. The price per calorie may be set and updated based on, individually or in combination: geographic region, type of establishment the dispensing machine 210 is located in, government regulation, third-party standards, owner/lessee preference, etc. For example, a price per calorie for a dispensing machine 210 located in a high school may be higher than the price per calorie for a dispensing machine 210 located in a fast-food restaurant. A user-customized beverage may vary in caloric content based on the particular combination of beverages and/or flavorings used to create the custom beverage. For example, a user may select on a Freestyle® dispensing machine to combine a zero-calorie cola with a high-calorie fruit flavoring. The quantity of the beverage may result modify the amount of calories in the beverage. In one embodiment, a user may make selections for a beverage on the graphic user interface 215. A price per unit of volume, such as a fluid ounce, based on the caloric content of the selected beverage combination may then be calculated and displayed to the user on the graphic user interface 215. Additionally or alternatively to a price per unit volume, a total caloric content and price may be displayed based on a predetermined receptacle size. For example, in one embodiment, receptacles of "small", "medium", and "large" sizes may be made available to a user where the dispensing machine is located. A price based on the calories of the selected beverage may be based on the volumes of the receptacles provided and may be displayed on the graphic user interface 215 in addition to or in place of a price per fluid ounce. In one embodiment, the receptacle chosen may be detected and the price for the beverage based on the set size of the receptacle communicated to the dispensing machine 210 and the caloric content of the user-defined beverage.

In another aspect of the disclosure, a parental and/or governmental control feature may be employed. Many types of products, such as alcoholic beverages, pharmaceuticals, birth control products, adult reading materials and videos and the like, and in some venues even calorie-containing beverages, may not be legally sold to minors. Yet it may be desirable for a seller of such products, referred to generally herein as "adult products," to be able to dispense them via a product dispenser or vending machine such as those described and referenced herein. Such sale of adult products might be accomplished, for example, by incorporating an age verification operation to verify that a consumer dispensing a product is old enough to purchase the product, such as in the case of an alcoholic beverage, a calorie-containing beverage, or any "adult product" that might be dispensed, such as birth control products, adult reading materials, via a Freestyle® type dispenser, yogurt dispenser, vending machine, etc. Such age verification operation may, for example, include face recognition modules, fingerprint identification technology, or any other known means of verifying the identity and/or age of an individual.

While the above example illustrates a variable price per unit volume, i.e., fluid ounces, it should be readily appreciated that the product dispenser of the present disclosure may be configured to dispense product by weight, by volume, or, in the case of solid products such as pharmaceuticals, by number of units, such as pills. Also, the variable pricing menu may be configured to vary the pricing per unit quantity based on the type of product being dispensed. For example, in the case of perfume, some brands may be more expensive per unit quantity than other brands, but the dispenser may be configured to dispense both higher and lower cost perfumes with variable pricing based on quantity purchased.

It should be here noted that variable pricing at a dispenser of product may be used to encourage, or discourage, more or less consumption of a product. Thus, if the product being dispensed is gasoline, the dispenser may be configured to charge a higher price per gallon the greater the quantity of gasoline being purchased, for example, during a finite purchasing operation by a single customer. Similarly, if the product being dispensed is an alcoholic beverage, the price per ounce of alcoholic beverage being dispensed from the dispenser may be configured to increase as greater volumes of beverage are purchased. Indeed, the dispenser may be configured to recognize a particular consumer has having purchased, during a finite time period, a quantity of alcohol that approaches the legal limit for alcoholic consumption for an adult of typical weight. In such situations, the dispenser may be configured to halt the sale or dispensing of alcohol to such consumer until a predetermined period of time has lapsed. Such dispenser might be of particular use at a bar or restaurant, where a server may not always be able to perceive the relative intoxication of a customer. Product dispensers, such as beer taps, in such establishments, may be configured to record the quantity of alcoholic beverages, such as beer, being poured for a particular consumer. The product dispensers may be configured to track alcohol consumption using radio-frequency identification (RFID) chips embedded in each consumer's cup, mug, or glass that are coded for each individual customer. The dispenser may include, for example, an RFID reader or other type of reader that recognizes and counts each pour of beer for a particular customer and halts additional pours after a predetermined number of servings have been recorded.

The system may similarly be used to discourage overconsumption of caloric products, such as sugar-containing beverages. Thus, if the system detects that a particular consumer has, in a predetermined time period, one hour for example, consumed an excessive number of calories, it may issue a warning to the consumer, either at the point of sale, the dispensing area, and/or via the consumer's handheld device, i.e., smart phone or tablet. Similarly, the system may be configured to disallow continued dispensing of purchased or free samples of product to a consumer that has exceeded a predetermined quantity of product and/or a predetermined number of calories consumed.

In other contexts, of course, the dispenser may be configured, as illustrated above, to decrease the price per ounce as the volume being purchased increases, according to volume discount pricing protocols employed, for example, by volume discount establishments such as Costco®.

The system of the present disclosure may be configured to permit a customer to communicate with the product dispensing machine 210, such as a Freestyle® machine, for example, using a smart phone 400 in place of, or in augmentation of, the touchscreen panel display 215 of the dispensing machine 210. Thus, the customer may, employing the systems, methods, and apparatus described herein, be able to request a custom mix of a beverage to sample as a free sample. Such enablement may be achievable with relatively inexpensive and/or commonly understood software upgrades to existing Freestyle® machine software and/or the Freestyle® mobile application 410.

The same technology employed in the existing Freestyle® machine to dispense beverage products may be repurposed to dispense other liquid products, such as perfume, cologne, cosmetics, etc., either as free samples and/or as purchased products per the disclosures contained herein. One particularly attractive use of the Freestyle® dispensing technology, given its micro-dosing capabilities, may be in the area of sampling highly volatile and/or expensive liquids such as perfumes, as such samples normally must be made in small quantities. Just as consumers may mix their own blends of beverages using the Freestyle® vending machine, they may do the same, employing the teachings herein to mix, for example, their own blends of cosmetics, perfumes, colognes, etc.

We claim:
1. A method comprising:
a. initiating a push notification intended for a mobile application associated with a mobile device of an intended recipient, the push notification offering a free product or free service to be provided at a point of sale;
b. receiving a response to the push notification indicative of an acceptance of the offering, the acceptance generated by the mobile application or the mobile device;
c. authorizing providing of the free product or free service to the intended recipient at the point of sale via a product dispenser or a service provider, respectively, the product dispenser or service provider configured to dispense sample sizes of free product or to authorize providing samples of free service and purchased product or purchased services corresponding to the free product or free service, respectively;
d. initiating a query to the intended recipient via the mobile application or the mobile device, seeking feedback related to the free product or provided free service wherein the feedback comprises a rating of the free product or free service by the user; and
e. upon receiving feedback from the user that the rating satisfies a predetermined rating value, offering the user an opportunity to purchase the purchased product or purchased service corresponding to the free product or free service, respectively.

2. The method of claim 1, including a registration step requiring the intended recipient to register an account with a provider of the mobile application or a mobile device service provider, the account granting the intended recipient access to the free product or free service at the point of sale.

3. The method of claim 2, wherein the registration step requires the intended recipient to provide customer information specific to the intended recipient.

4. The method of claim 3, wherein the customer information specific to the intended recipient comprises one or more of the intended recipient's location, demographic information, consumer preferences, and payment information.

5. The method of claim 1, wherein providing the free product or free service at the point of sale comprises dispensing of a sample size of a beverage.

6. The method of claim 1, including, prior to initiating the query, the step of receiving information indicative of the free product or free service having been provided.

7. The method of claim 6, wherein the feedback sought by the query comprises one or more of querying the intended recipient to rate the free product or free service or to indicate whether a future purchase of the purchased product or purchased service corresponding to the free product or free service, respectively, would be desired.

8. The method of claim 1, wherein a plurality of different free products or free services is offered, and the intended recipient is queried, following sampling the plurality of different free products or free services, to rate the different free products or free services.

9. A product dispenser configured to dispense a product, responsive to a request indicative of an acceptance, generated by a mobile application, from a mobile device configured to receive push notifications intended for the mobile application associated with an intended recipient, the push notifications offering dispensing of the product from the product dispenser, the product dispenser further configured to request or receive via the mobile device, after dispensing the product, feedback from the intended recipient related to the dispensed product, wherein the product dispenser is configured to dispense both sample sizes of free product and purchased product corresponding to the free product, wherein the feedback comprises a rating of the free product by the intended recipient, the product dispenser further configured, upon receiving feedback from the intended recipient that the rating satisfies a predetermined rating value, to offer the intended recipient an opportunity to purchase the purchased product corresponding to the free product.

10. The product dispenser of claim 9, wherein the sample size of a free product is selected from the group consisting of beverages, soap, detergent, lotion, cosmetics, perfume, cologne, mouthwash, pharmaceuticals, and contact lens solution.

11. The product dispenser of claim 9, wherein the product dispenser comprises a beverage dispenser comprising a product quantity discriminator configured to discriminate between, and dispense the sample size of a free product or a purchased product corresponding to the sample size of a free product, according to whether a purchased product corresponding to the sample size of a free product or the sample size of a free product has been selected for dispensing.

12. The product dispenser of claim 9, wherein the feedback comprises one or more of a rating by the intended recipient of the free product or the purchased product, or obtaining from the intended recipient an indication of whether a future purchase of the free product or the purchased product would be desired.

13. The product dispenser of claim 9, wherein the product dispenser is further configured to enable age verification of the intended recipient.

14. The product dispenser of claim 9, wherein the product dispenser is further configured to dispense a plurality of different free products, and wherein the feedback comprises a rating by the intended recipient of the plurality of different free products.

15. A system comprising a product dispenser in wireless communication with a mobile device, the product dispenser configured to dispense a free product, responsive to an instruction from the mobile device indicative of an acceptance, generated by a mobile application, of a push notification offer, the mobile device comprising the mobile application configured to receive push notifications offering to dispense the free product from the product dispenser, the system further configured to query a user of the mobile device, following dispensing of the free product, the query seeking feedback related to the dispensed free product, wherein the product dispenser is configured to dispense both sample sizes of the free product and purchased product corresponding to the free product, wherein the feedback comprises a rating of the free product by the user, the product dispenser further configured, upon receiving feedback from the user that the rating satisfies a predetermined rating value, to offer the user an opportunity to purchase the purchased product corresponding to the free product.

16. The system of claim 15, wherein the system is further configured, prior to initiating the query, to receive information indicative of the free product having been dispensed.

17. The system of claim 15, wherein the feedback comprises one or more of a rating of the free product by the user, or obtaining from the user an indication of whether a future purchase of the purchased product corresponding to the free product would be desired.

18. The system of claim 15, wherein if the rating does not satisfy the predetermined rating value, they system is further configured to receive negative feedback relative to the free product.

19. The system of claim 15, wherein the free product comprises a beverage sample.

20. The system of claim 15, wherein the product dispenser is further configured to dispense a plurality of different free products, and wherein the feedback comprises a rating by the user of the plurality of different free products.

* * * * *